(12) United States Patent
Lucas et al.

(10) Patent No.: US 10,756,365 B2
(45) Date of Patent: Aug. 25, 2020

(54) WATER SEPARATOR INCLUDING A RISER PIPE AND A SEALING ELEMENT AS WELL AS A FUEL CELL INCLUDING A WATER SEPARATOR, AND A MOTOR VEHICLE INCLUDING A FUEL CELL

(71) Applicant: Volkswagen Aktiengesellschaft, Wolfsburg (DE)

(72) Inventors: Christian Lucas, Braunschweig (DE); Natalja Ermatschenko, Wolfsburg (DE)

(73) Assignee: AUDI AKTIENGESELLSCHAFT, Ingolstadt (DE)

( * ) Notice: Subject to any disclaimer, the term of this patent is extended or adjusted under 35 U.S.C. 154(b) by 652 days.

(21) Appl. No.: 14/924,392

(22) Filed: Oct. 27, 2015

(65) Prior Publication Data
US 2016/0118677 A1 Apr. 28, 2016

(30) Foreign Application Priority Data
Oct. 27, 2014 (DE) .......... 10 2014 221 848

(51) Int. Cl.
*H01M 8/04* (2016.01)
*B01D 45/00* (2006.01)
*H01M 8/04119* (2016.01)
*H01M 8/04291* (2016.01)

(52) U.S. Cl.
CPC ........ *H01M 8/04156* (2013.01); *B01D 45/00* (2013.01); *H01M 8/04164* (2013.01); *H01M 8/04291* (2013.01); *H01M 2250/20* (2013.01); *Y02T 90/32* (2013.01)

(58) Field of Classification Search
CPC ......... H01M 8/04156; H01M 8/04164; H01M 8/04291; B01D 45/00
See application file for complete search history.

(56) References Cited

U.S. PATENT DOCUMENTS

| 6,149,810 A * | 11/2000 | Gonzalez-Martin ... B01D 53/22 204/252 |
| 2009/0023019 A1 | 1/2009 | Koenekamp et al. |
| 2010/0183939 A1 * | 7/2010 | Sekine .................. B01D 45/06 429/457 |

FOREIGN PATENT DOCUMENTS

| DE | 102008033472 A1 | 2/2009 |
| DE | 102011120536 A1 | 6/2013 |
| DE | 102012020280 A1 | 11/2013 |
| GB | 1472221 A | 5/1977 |
| JP | H11-257805 A | 9/1999 |
| WO | WO 2013083223 | 6/2013 |

* cited by examiner

*Primary Examiner* — Ula C Ruddock
*Assistant Examiner* — Frank A Chernow
(74) *Attorney, Agent, or Firm* — Pearl Cohen Zedek Latzer Baratz LLP

(57) ABSTRACT

The invention relates to a water separator for separating product water from a fuel cell, a fuel cell including a water separator and a motor vehicle including a fuel cell. To design the water separator to be as compact as possible and to be able to operate it in a frost-proof manner, it is provided according to the invention that the water separator has a sealing element and a riser pipe extending through the sealing element.

13 Claims, 3 Drawing Sheets

WATER SEPARATOR INCLUDING A RISER PIPE AND A SEALING ELEMENT AS WELL AS A FUEL CELL INCLUDING A WATER SEPARATOR, AND A MOTOR VEHICLE INCLUDING A FUEL CELL

CROSS REFERENCE TO RELATED APPLICATION

This application claims priority from German Patent Application No. DE 10 2014 221 848.9, filed Oct. 27, 2014, which is incorporated herein in its entirety.

FIELD OF THE INVENTION

The present invention relates to a water separator for separating product water from a fuel cell, including a separator tank for receiving the product water, the separator tank having a primary outlet and a secondary outlet for discharging the product water out of the collecting tank, including a sealing element, designed to seal the primary outlet in a fluid-tight manner in its sealing position, and including a riser pipe, which is connected to the secondary outlet to conduct fluid. Furthermore, the present invention relates to a fuel cell including a water separator for separating product water from the fuel cell. In addition, the present invention relates to a motor vehicle including a power plant and a fuel cell connected to the power plant for transmitting operating power.

BACKGROUND OF THE INVENTION

Water separators for separating product water from a fuel cell, fuel cells including a water separator and motor vehicles including fuel cells are known in general. For example, one such water separator is described in DE 10 201 2 020 280 A1.

Fuel cells make use of the chemical reaction of a fuel cell with oxygen to generate electricity. For this purpose, fuel cells include as the core component the so-called membrane electrode assembly or unit (MEA), which may be designed as an assemblage of the membrane, which conducts ions, in particular protons, and an electrode (anode and cathode) situated on each side of the membrane. The active material may contain a catalyst or comprise a catalyst which facilitates the chemical reaction. Furthermore, gas diffusion layers may be situated on the sides of the electrodes facing away from the membrane on both sides of the membrane electrode assembly. The fuel cell has at least one membrane electrode assembly or a plurality of membrane electrode assemblies, which may be situated in a fuel cell stack, the powers of a plurality of membrane electrode assemblies being additive. During operation of the fuel cell, an operating medium, for example, the fuel, in particular hydrogen ($H_2$) or a gas mixture containing hydrogen, is supplied to the anode, where $H_2$ is oxidized electrochemically to H+ and releases electrons. Water-bound or waterless transport of the protons H+ out of the anode space into the cathode space takes place across the membrane, which separates reaction spaces of the fuel cell from one another in airtight, gas-tight manner. The electrons made available at the anode are supplied to the cathode via an electrical line. The cathode receives another operating medium, for example, oxygen ($O_2$) or a gas mixture containing oxygen, so that $O_2$ is reduced to $O^{2-}$ with an uptake of the electrons. At the same time, these oxygen anions in the cathode space react with protons transported across the membrane to form water. Due to the direct conversion of chemical energy into electricity, fuel cells achieve an improved efficiency in comparison with other electricity generators because they bypass the Carnot factor.

When operation of the fuel cell is stopped and the motor vehicle including the fuel cell is parked, for example, product water present in the separator tank is preferably drained out. This prevents the product water from freezing in the water separator at low temperatures below the freezing point of water and thereby clogging the outlets. In other words, if the outlets are closed, then any new product water generated when operation of the fuel cell is resumed cannot flow out of the separator tank, so the tank may overflow. In particular the primary outlet may clog due to freezing product water. If, after stopping operation of the fuel cell, there is no product water, at least inside the riser pipe, then, beyond a predetermined fill level of the separator tank, product water newly directed into the separator tank may pass through the riser pipe to the secondary outlet.

Even if the separator tank is emptied during or after stopping operation of the water separator, condensate may form during cooling of the water separator or other parts of the fuel cell, which may flow into the separator tank and possibly freeze there. To prevent freezing of the condensate in the primary outlet, thereby clogging it, the sealing element may close the primary outlet and thus prevent freezing condensate, which might be formed later, from penetrating into the primary outlet.

However, the uptake capacity for product water of a known water separator is limited by the sealing element and the riser pipe, so that separator tanks of known water separators must have larger dimensions in order to be able to hold the same amount of product water as water separators in which neither the riser pipe nor the sealing element is situated in the separator tank. In particular, when the fuel cell is to be used in a motor vehicle, the installation space available for the fuel cell is limited, so that the collecting tank cannot readily be enlarged.

SUMMARY OF THE INVENTION

The object of the present invention is to provide a water separator, a fuel cell including a water separator and a motor vehicle including a fuel cell, the water separator being designed to have preferably small dimensions and being operable in a frost-proof manner.

For the water separator mentioned at the outset, this object is achieved by the fact that the riser pipe extends through the sealing element. For the fuel cell mentioned at the outset, this object is achieved by the fact that the water separator is a water separator according to the present invention. For the motor vehicle mentioned at the outset, this object is achieved in that the fuel cell is a fuel cell according to the present invention.

The water separator may be designed to be more compact due to the fact that the riser pipe extends through the sealing element since the riser pipe and the sealing element are not designed separately from one another and therefore require more installation space.

The approach according to the present invention may be further improved through various embodiments which are advantageous per se and, unless designed differently, may be arbitrarily combined with one another. These embodiments and the advantages associated with them are described in detail below.

The sealing element may thus be guided movably in relation to the riser pipe, and the movement of the sealing element may be guided by the riser pipe. In particular the sealing element may be movable out of its sealing position and into a release position along the riser pipe. Thus no additional means are necessary for guiding the movement of the sealing element inside the separator tank, so that the internal volume of the separator tank, which is available for the product water, is further increased in comparison with known water separators using additional guide means.

The sealing element may run at least partially, preferably completely, around the riser pipe. For example, the sealing element may run more than 180 degrees around a central axis A of the riser pipe, thereby preventing displacement of the sealing element transversely to central axis A or to the riser pipe. Consequently, the sealing element cannot easily fall down from the riser pipe and no other means for fastening the sealing element on the riser pipe, which would further restrict the internal volume of the separator tank, are available for product water.

The separator tank may have at least one additional primary outlet. At least the one and preferably all primary outlets may be situated outside of the riser pipe, so that, during regular operation of the fuel cell, product water may be drained effectively past the riser pipe and through the primary outlets.

The primary outlets may in particular run through a bottom of the separator tank, whereby the primary outlets preferably run through sections of the bottom adjacent to the riser pipe. The secondary outlet may also extend through the bottom and open into the interior of the riser pipe, so that product water flowing out through the riser pipe may flow out of the interior volume of the separator tank through the secondary outlet. Due to the configuration of the primary outlets in the vicinity of the riser pipe, the sealing element may have a small dimension and may nevertheless close the primary outlets in a fluid-tight manner in their sealing position. Larger sealing elements would require more space in the interior volume of the separator tank, so that less space would be available for product water in the separator tank.

The riser pipe is preferably supported on the bottom at one of its ends and is connected thereto in a fluid-tight manner and is, for example, fastened to the bottom.

To be able to design the sealing element to be even more compact, the primary outlets are preferably situated in such a way that they surround the riser pipe. In this case, the sealing element may be designed to seal all primary outlets in the sealing position of the sealing element, whereby the sealing element does not protrude an unnecessarily great distance away from the riser pipe.

The riser pipe is preferably designed as a hollow cylinder having an annular base area since condensate or product water may accumulate at the edges or in corners of a riser pipe provided with a polygonal base area and cannot be readily discharged out of such a riser pipe.

For example, the wall of the riser pipe and a sealing part of the sealing element may be designed as concentric rings. If the sealing element moves around the riser pipe due to vibrations during operation, for example, then accidental slippage of the sealing element transversely to the riser pipe is reliably prevented. If the sealing element completely surrounds the riser pipe transversely to its central axis A, and if the sealing element and the wall are designed as concentric rings, then the sealing element may move around the riser pipe without thereby impairing the sealability of the primary outlets by the sealing element.

The sealing element may be designed as a floater so that the sealing element is operable by product water present in the separator tank. Therefore, no additional and possibly sensor-controlled actuating device is necessary for the sealing element. Furthermore, the sealing element designed as a floater is trouble-free and is operable in a low-maintenance or even maintenance-free manner.

The sealing element is preferably designed to be lifted up by water in the separator tank from its sealing position only when the fill level of the separator tank exceeds a predefined level. The predefined value is preferably greater than zero. This prevents lifting of the sealing element by very small amounts of water situated in the separator tank, for example, condensate, which could raise the sealing element and be deposited on the primary outlet, where it could freeze.

To prevent the sealing element from being lifted up out of its sealing position by even very small amounts of water in the separator tank, the sealing element may, for example, be designed in such a way that a friction effect between the riser pipe and the sealing element counteracts a movement of the sealing element out of its sealing position. Alternatively or additionally, the thickness of the sealing element may be predefined, in such a way that water lifts up the sealing element only after the predefined fill level has been reached. The predefined fill level may be given in percentage of the thickness of the sealing element parallel to central axis A of the riser pipe. The predefined fill level is preferably lower than the thickness and amounts to, for example, between 90% and 50%, in particular 80%, 70% or 60% of the thickness.

Alternatively or additionally, a blocking element which prevents the sealing element from moving out of its sealing position may be provided. The blocking element is preferably situated above the sealing element in the direction of gravity and causes a blocking of the movement of the sealing element out of its sealing position and against the direction of gravity. The blocking element may be a floating blocking element, which releases the sealing element as soon as the prevailing fill level of the separator tank exceeds the predefined value. For example, the blocking element is a release lever including an actuating floater.

In order for the sealing element not to be able to slip down from the riser pipe, the water separator may have a stop element for the sealing element, which is provided on the riser pipe and limits the maximum floating height of the sealing element. Again it is not necessary to provide a stop element, which is designed and situated separately, so that the water separator is simple to construct.

The stop element preferably protrudes away from the riser pipe and may be provided by a flanged free end of the riser pipe, for example. The free end may face away from the bottom. To prevent tilting of the sealing element when it is in contact with the stop element, the stop element may protrude away from exterior sides of the riser pipe pointing away from one another. The stop element protruding away from the riser pipe preferably surrounds the riser pipe at least partially and, for example, completely.

The stop element may thus have an essentially annular or toroidal shape. As an alternative to a one-piece design of the stop element with the riser pipe, it may be formed separately and fastened onto the riser pipe, so that the stop element is shapeable independently of the riser pipe.

To prevent condensate from running into the riser pipe from the stop element, the top side of the stop element pointing away from the bottom may be chamfered. The top side preferably runs away from the pipe in at least some sections and in the direction toward the bottom, so that a thickness of the stop element to be measured in parallel with central axis A of the riser pipe decreases away from the pipe.

In addition, the riser pipe may be covered by a cover situated at a distance from the free end of the riser pipe in parallel with central axis A of the riser pipe at least in its operating position and prevents water from dripping into the riser pipe. The cover may also be designed as a floater, which in its sealing position may rest on the free end of the riser pipe.

The bottom of the separator tank may be an intermediate bottom which divides the interior volume of the separator tank into a separation volume and a drain volume. The outlets may extend through the intermediate bottom, connecting the separation volume to the drain volume in a fluid-conducting manner. The drain volume receives water running out through the primary and secondary outlets. Therefore it is not necessary to connect the outlets by lines, pipes or tubing, for example, each to be provided separately, so that the water separator is simple to assemble.

The drain volume may be limited by the intermediate bottom and a lower section of the separator tank, whereby the lower section of the separator tank may be referred to as a drain container. The drain container may have a base, which is situated opposite the intermediate bottom. A tertiary outlet is preferably situated in the base; product water, having flowed through the primary and/or secondary outlet(s), is able to flow out of the drain container through this tertiary outlet. The tertiary outlet may be closable by a valve if the product water is to be collected in the separator tank.

The water separator may have at least one additional sealing element through which the riser pipe preferably extends. The additional sealing element may be designed like the previous sealing element and may have its advantages. In particular the additional sealing element may be designed to be movable relative to the riser pipe. Furthermore, the additional sealing element may surround the riser pipe at least partially. The wall of the riser pipe and a sealing part of the additional sealing element may also be designed as concentric rings. The additional sealing element is also preferably designed as a floater, whereby the additional sealing element may be designed to be lifted up out of its sealing position by water present in the separator tank only when the fill level of the separator tank exceeds a predefined value. In addition, the water separator may limit the maximum floating height of the sealing element and the additional sealing element and may therefore have the stop element provided on the riser pipe and an additional stop element. The additional stop element in particular may limit the floating height of the additional sealing element.

If the water separator has at least two sealing elements, then the sealing position of the additional sealing element may be provided downstream from the stop element, as viewed from the bottom, situated between the additional stop element and the bottom. For example, in its sealing position, the additional sealing element may seal at least one inlet of the riser pipe, which may be situated between the two stop elements and may be adjacent to the stop element situated between the additional stop element and the bottom. In its sealing position, the additional sealing element may thus be in contact with the stop element situated between the additional stop element and the bottom.

If the water separator has the additional stop element, it may limit the floating height of the previous sealing element, so that, in its operating position, the previous sealing element is no longer in contact with the stop element but instead is in contact with the additional stop element.

If the water separator is only partially filled with product water, so that the product water does not rise much or at all above the additional stop element, the additional sealing element may be situated in its lowest possible position, i.e., in its sealing position, and may at least close the at least one inlet. It is possible in this way to prevent any gas such as hydrogen present above the product water from being able to flow out of the water separator through the riser pipe to the outlet and from there through the valve.

If the water separator has been emptied and contains little or no product water, condensate may form due to cooling. The condensate may accumulate in the lower area of the separator tank. It is desirable here for the condensate not to run into the valve to prevent blockage of the valve due to frozen water in it. The sealing element preferably does not move out of its sealing position in the direction of its operating position immediately after the influx of new product water so that at low temperatures, i.e., at temperatures below the freezing point of water, no product water is able to flow into the valve and freeze there.

It may happen that frozen condensate or frozen residues of the product water are present on the bottom and prevent movement of the sealing element away from the bottom. During operation, product water running into the separator tank may accumulate there so that the product water level inside the separator tank rises. If the product water level reaches the additional sealing element, the latter may be moved out of its sealing position by the product water, so that the product water may flow out of the separator tank, namely through the at least one inlet into the riser pipe and from there through the outlet, which opens into the riser pipe.

The water separator is preferably situated along an exhaust gas path of the fuel cell, whereby the exhaust gas path may extend through the water separator. Product water contained in the exhaust gas path may be separated from the exhaust gas at least partially with the water separator, so that the dried exhaust gas may be reused and may be conducted to a turbine, for example. The product water separated by the water separator may be drained and/or conducted to a product water consumer.

BRIEF DESCRIPTION OF THE DRAWINGS

The present invention is explained below in exemplary embodiments on the basis of the accompanying drawings.

DETAILED DESCRIPTION OF THE INVENTION

The present invention is explained below as an example on the basis of specific embodiments with reference to the drawings. The various features of the exemplary specific embodiments may be combined independently of one another, as already explained with the individual advantageous embodiments.

The design and function of a water separator according to the present invention is initially described with reference to the exemplary embodiment in FIG. 1.

Figure 1:
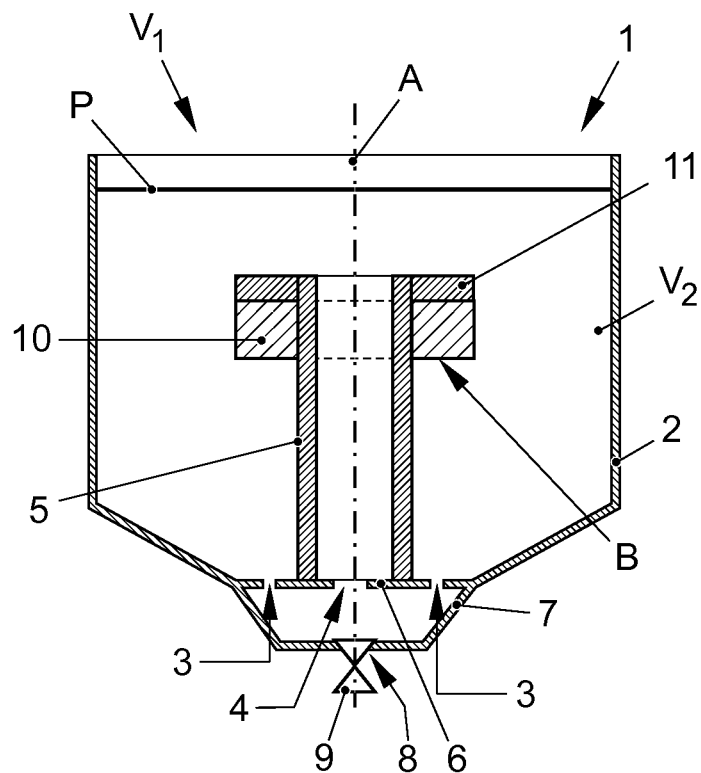
FIG. 1 shows a schematic sectional representation of an exemplary embodiment of the water separator according to the present invention.

FIG. 1 shows water separator 1 according to the present invention for separating product water P of a fuel cell, including a separator tank 2. The representation in FIG. 1 is a lateral sectional representation. In the exemplary embodiment in FIG. 1, separator tank 2 has two primary outlets 3. Furthermore, water separator 1 of the exemplary embodiment in FIG. 1 is provided with a secondary outlet 4. Product water P separated by water separator 1 may flow from separator tank 2 through outlets 3, 4.

Furthermore, water separator 1 has a riser pipe 5, which has a fluid-conducting connection to secondary outlet 4. For example, riser pipe 5 may contact secondary outlet 4 in a fluid-conducting manner, i.e., connecting it to conduct fluid to secondary outlet 4 so that product water P in riser pipe 5 is able to flow directly into secondary outlet 4. Secondary outlet 4 thus preferably opens into riser pipe 5.

Secondary outlet 4 is provided at a distance from, for example, between primary outlets 3. The distance from primary outlets 3 to secondary outlet 4 is such that riser pipe 5 has a fluid-conducting connection only to secondary outlet 4 but not to one of primary outlets 3. Consequently only secondary outlet 4 opens into riser pipe 5 but not any one of primary outlets 3.

Outlets 3, 4 extend through a bottom 6 of separator tank 2. To be able to supply product water P to a collecting line which flows through outlets 3, 4, multiple lines may be connected to outlets 3, 4, these lines leading to the collecting line.

Bottom 6 may be designed as an intermediate bottom 6. A drain container 7, into which both primary outlets 3 and secondary outlet 4 may open, is preferably situated on one side of intermediate bottom 6 facing away from riser pipe 5.

Drain container 7 may have a tertiary outlet 8 through which the water having run into drain container 7 is able to emerge therefrom and flow into a collecting line, for example. A valve 9 with which the outflow of water out of separator tank 2 may be influenced may be provided between tertiary outlet 8 and the collecting line. An inside diameter of tertiary outlet 8 is preferably smaller than an inside diameter of riser pipe 5. If tertiary outlet 8 is situated concentrically with riser pipe 5, for example, along central axis A of riser pipe 5, then water condensing on the inside wall of the riser pipe cannot drip directly into tertiary outlet 8 or into valve 9 so that an unwanted influx of condensed water into valve 9 is prevented. Drain container 7 may be an integral part or a section of separator tank 2 or a container designed separately and mounted on separator tank 2.

Intermediate bottom 6 divides interior volume V1 of separator tank 2 into a separation volume V2, in which, among other things, riser pipe 5 and/or sealing element 10 may be situated, and a drain volume V3, which is delimited by drain container 7 and intermediate bottom 6.

To be able to seal primary outlets 3 in a fluid-tight manner as needed, water separator 1 has a sealing element 10. In the exemplary embodiment in FIG. 1, sealing element 10 is shown in its operating position or release position B, in which sealing element 10 is situated at least partially and, for example, at the maximum distance from primary outlets 3 and consequently does not seal them in a fluid-tight manner. Sealing element 10 may run around the riser pipe transversely to its central axis A and may be guided by riser pipe 5 in its movement between operating position B and a sealing position (not shown in the exemplary embodiment in FIG. 1).

Sealing element 10 may run more than 180 degrees around central axis A of riser pipe 5, so that sealing element 10 cannot easily slip down from riser pipe 5 transversely to central axis A. Sealing element 10 and optionally one or multiple sealing parts of sealing element 10 preferably run(s) completely around riser pipe 5, so that sealing element 10 may also seal primary outlets 3 even when sealing element 10 is rotated in its sealing position around central axis A. If water separator 1 is a water separator of a fuel cell or of a motor vehicle, then vibrations occurring during operation may rotate sealing element 10 around riser pipe 5. However, this does not result in defective closure of primary outlets 3 by sealing element 10 if its sealing part is designed in an annular shape or if sealing element 10 has multiple sealing parts, which jointly form a ring.

Riser pipe 5 and sealing element 10 may be designed in such a way that an interior of sealing element 10 is designed to be essentially complementary to an exterior of riser pipe 5. In particular one annular sealing part or multiple sealing parts arranged to form a ring of sealing element 10, and a wall of riser pipe 5, may be shaped to form concentric rings.

So that sealing element 10 cannot accidentally slip down from riser pipe 5 along central axis A, water separator 1 preferably has a stop element 11 for sealing element 10. Stop element 11 protrudes away from the end of riser pipe 5 facing away from intermediate bottom 6 and may surround riser pipe 5 in at least some sections or even completely. Alternatively, water separator 1 may have at least two stop elements 11 protruding in different directions away from riser pipe 5, for example, in opposite directions. The direction in which stop element 11 protrudes from riser pipe 5 preferably points transversely to central axis A and away from it in particular.

Sealing element 10 may be designed as a floater, so that water present in water separator 1 may actuate sealing element 10 and in particular move it out of its sealing position in the direction of operating position B. In the exemplary embodiment in FIG. 1, separator tank 2 is essentially completely filled with product water P, so that a fill level F of separator tank 2 is higher than the end of riser pipe 5 pointing away from intermediate bottom 6, and sealing element 10 is in contact with stop element 11 due to buoyancy. In this case, product water P may readily flow out through primary outlets 3 and secondary outlet 4 when valve 9 is opened.

Figure 2:
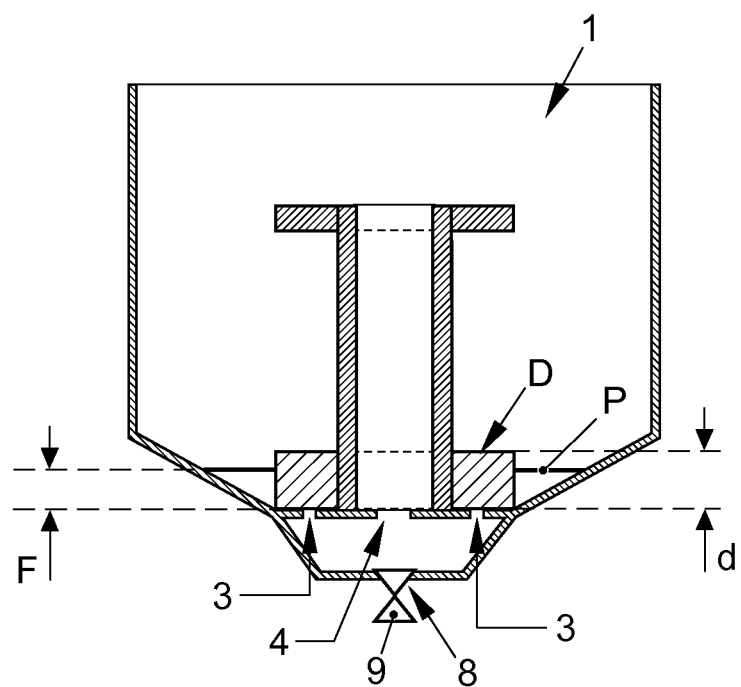
FIG. 2 shows a schematic sectional representation of the exemplary embodiment in FIG. 1, wherein a sealing element of the water separator is shown in its sealing position.

FIG. 2 shows the exemplary embodiment in FIG. 1 having a lower fill level.

In contrast with FIG. 1, less product water P is present in separator tank 2 in FIG. 2. Sealing element 10 is shown in its sealing position D, in which it seals primary outlets 3 in a fluid-tight manner. Sealing element 10 is in contact with intermediate bottom 6, even in the case of a fill level F of separator tank 2, as shown in FIG. 2, which is greater than zero but less than a thickness d of sealing element 10, in such a way that product water in separator tank 2 and in particular in its separation volume V2 cannot reach primary outlets 3 to any mentionable extent or not at all. However, secondary outlet 4 is still unsealed, so that product water may additionally flow into separator tank 2 through riser pipe 5 and secondary outlet 4 from separation volume V2 into drain volume V3.

In sealing position D, at least the sealing part of sealing element 10 may be in contact with intermediate bottom 6 and may be forced against it by the weight of sealing element 10, for example. Intermediate bottom 6 thus forms an opposite sealing surface for sealing element 10.

Figure 3:
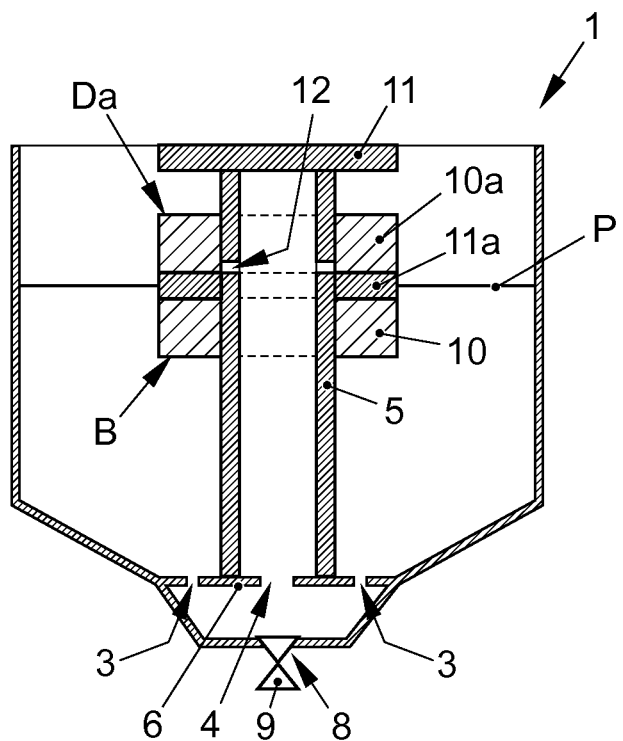
FIG. 3 shows a schematic sectional representation of another exemplary embodiment of the water separator according to the present invention.
Figure 4:
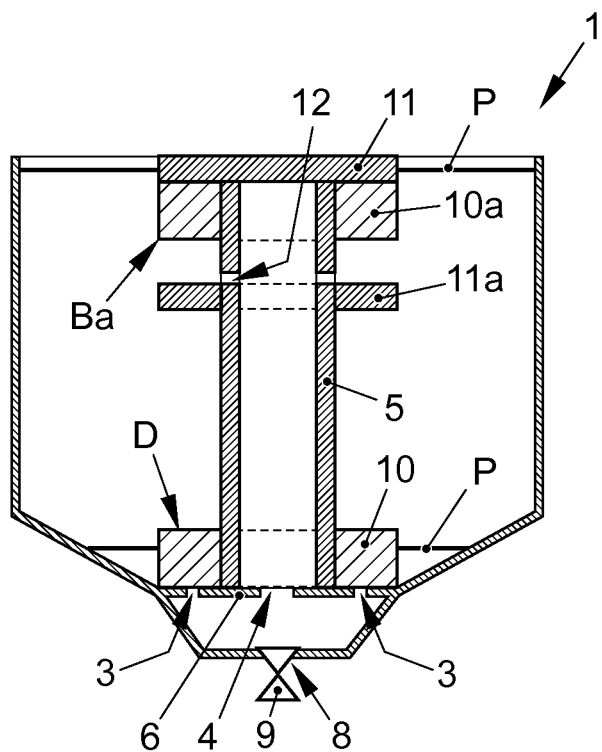
FIG. 4 shows another schematic sectional representation of the exemplary embodiment in FIG. 3.

FIGS. 3 and 4 schematically show another exemplary embodiment of water separator 1 according to the present invention having different fill levels. The same reference numerals are used for elements corresponding in design and/or function to elements of the previous exemplary embodiment. For the sake of brevity, only the differences in comparison with the previous exemplary embodiment are discussed below.

In the exemplary embodiment in FIGS. 3 and 4, water separator 1 has two sealing elements 10, 10a, situated one above the other along riser pipe 5 during operation of water separator 1. To define operating position B of sealing element 10, water separator 1 has an additional stop element 11a, which is situated between primary outlets 3 and stop element 11. Additional stop element 11a in particular is situated at a distance from stop element 11 and from bottom 6 and is mounted on riser pipe 5, for example. Additional stop element 11a is preferably situated between two sealing elements 10, 10a and defines sealing and operating positions D, Da, B, Ba of two sealing elements 10, 10a. Sealing elements 10, 10a are movable between their sealing positions D, Da and their operating positions B, Ba. Sealing element 10 is thus displaceable between bottom 6 and additional stop element 11a, and sealing element 10a is displaceable between additional stop element 11a and stop element 11.

Sealing position D of lower sealing element 10 corresponds to sealing position D of sealing element 10 of the previous exemplary embodiment. However, in the exemplary embodiment in FIGS. 3 and 4, operating position B of sealing element 10 lies along riser pipe 5 and, as viewed from bottom 6, in front of operating position B of sealing element 10 in the previous exemplary embodiment. In its operating position B, sealing element 10 is in contact with additional stop element 11a, for example, when the level of product water P inside the separator tank is at or above the height of additional stop element 11a.

In its operating position Ba, additional sealing element 10a, like sealing element 10 in the previous exemplary embodiment, may be in contact with stop element 11. In its sealing position Da, additional sealing element 10a may be in contact with additional stop element 11a, preferably on its side facing away from bottom 6.

Riser pipe 5 may have at least one inlet 12, which seals additional sealing element 10a in its sealing position Da and is accessible in operating position Ba of sealing element 10a. For example, inlet 12 may extend through a wall in riser pipe 5 and may be adjacent to additional stop element 11a or may at least be situated in the vicinity thereof.

The end of riser pipe 5 pointing away from bottom 6 may be sealed by stop element 11, for example.

If water separator 1 is filled only partially with product water P, so that product water P does not rise above additional stop element 11a or not significantly, additional sealing element 10a may be situated in its lowest possible position, i.e., in its sealing position Da, and may close at least one inlet 12. This makes it possible to prevent a gas, such as hydrogen, which may be present above product water P, from being able to flow out of water separator 1 through riser pipe 5 to outlet 4 and from there through the valve.

If water separator 1 has been emptied and contains very little or no product water P, condensate may form due to cooling. The condensate may accumulate in the lower area of separator tank 2. In order to prevent blockage of valve 9 due to frozen water therein, it is desirable here for the condensate not to run into valve 9. Sealing element 10 preferably does not move out of its sealing position D in the direction of its operating position B immediately after the influx of new product water P, so that product water P cannot flow into valve 9 and freeze there at low temperatures, i.e., at temperatures below the freezing point of water.

It may happen that frozen condensate or frozen residues of product water are present on bottom 6 and prevent movement of sealing element 10 away from bottom 6. Product water P flowing into separator tank 2 may accumulate during operation, causing the product water level inside separator tank 2 to rise. If the product water level reaches additional sealing element 10a, it may be moved by product water P out of its sealing position Da, so that product water P is able to flow out of separator tank 2, namely through at least one inlet 12 into riser pipe 5 and from there through outlet 4 opening into riser pipe 5.

Figure 5:
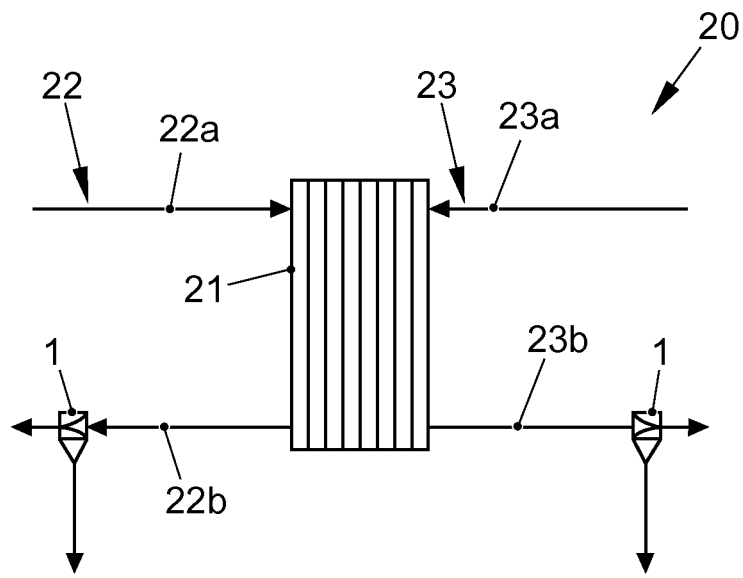
FIG. 5 shows a schematic representation of an exemplary embodiment of a fuel cell according to the present invention.

FIG. 5 schematically shows an exemplary embodiment of a fuel cell according to the present invention, including a water separator 1. The same reference numerals are used for elements which correspond in function and/or design to elements of the exemplary embodiment in FIGS. 1 and 2.

Fuel cell 20 is, for example, a fuel cell 20 for a motor vehicle and has a fuel cell stack 21, which is dimensioned in such a way that, for example, the electricity generatable by fuel cell 20 is at least partially sufficient to drive the motor vehicle.

To be able to supply fuel cell stack 21 with operating media, fuel cell 20 has an anode gas path 22 for conducting the operating medium anode gas to fuel cell stack 21 and a cathode gas path 23 for conducting the operating medium cathode gas to fuel cell stack 21. Anode gas path 22 and cathode gas path 23 each have an inlet section 22a, 23a, through which the corresponding operating medium may be conducted to fuel cell stack 21.

Furthermore, anode gas path 22 and cathode gas path 23 both have an exhaust gas section 22b, 23b, through which exhaust gases from fuel cell stack 21 may flow out. One water separator 1 may be provided along each exhaust gas section 22b, 23b, to remove product water P from the exhaust gases of fuel cell stack 21. In the exemplary embodiment in FIG. 3, at least exhaust gas section 22b of anode gas path 22 has a water separator 1, so water may be removed by water separator 1 from anode exhaust gas flowing through anode gas path 22.

Exhaust gas section 23b of cathode gas path 23 may extend through a water separator 1. Fuel cell 20 may thus have at least one water separator 1, through which either anode gas path 22 or cathode gas path 23 passes. Alternatively, not just one of gas paths 22, 23 but both anode gas path 22 and cathode gas path 23 may extend through one water separator 1. Two water separators 1 may optionally be provided, in which case cathode exhaust gas path 23 [sic] may extend through one water separator 1 and cathode gas path 23 may extend through the other water separator 1.

Product water P separated from anode gas path 22 by water separator 1 may be supplied to exhaust gas section 23b of cathode gas path 23 according to the exemplary embodiment in FIG. 5, to enable its discharge through exhaust gas section 23b of cathode gas path 23, so that separate draining of product water P from the anode exhaust gas is unnecessary.

In the exemplary embodiment in FIG. 3, the at least one water separator 1 is preferably designed according to the exemplary embodiment in FIGS. 1 and 2.

Figure 6:
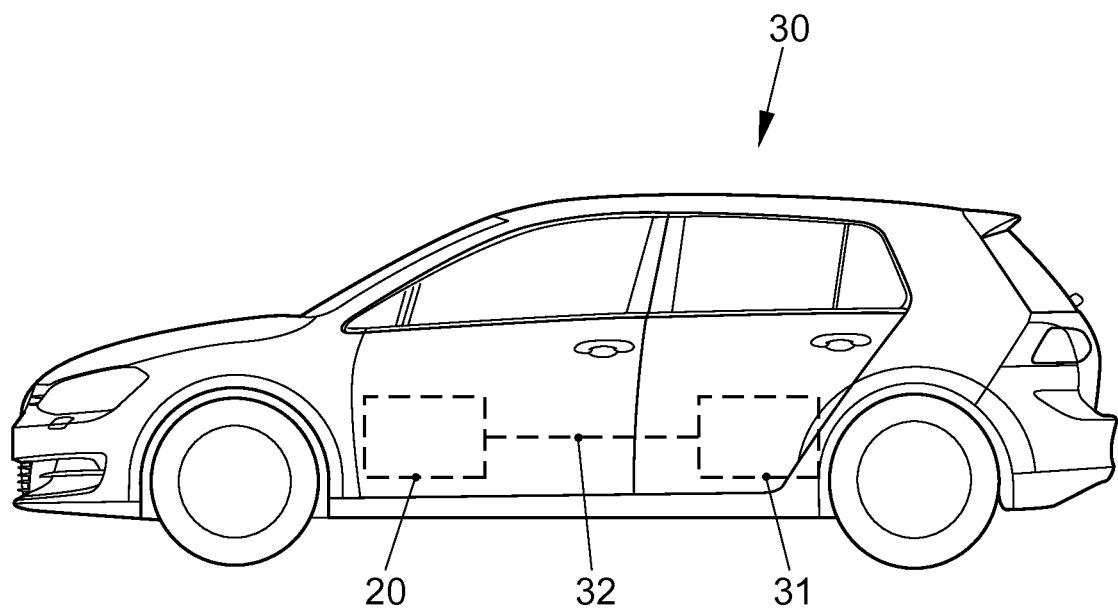
FIG. 6 shows a schematic representation of an exemplary embodiment of a motor vehicle according to the present invention.

FIG. 6 schematically shows an exemplary embodiment of a motor vehicle 30 according to the present invention, including a fuel cell 20 and a power plant 31. The same reference numerals have been used for elements which correspond in function and/or design to elements of the exemplary embodiment in FIG. 3.

Power plant 31 is designed to at least partially drive motor vehicle 30. Operating power for power plant 31 is made available at least partially by fuel cell 20 during operation. Fuel cell 20 in the exemplary embodiment in FIG. 4 is preferably designed according to the exemplary embodiment in FIG. 3 and is connected to power plant 31 by an operating power line 32 for transmitting operating power.

LIST OF REFERENCE NUMERALS 1 water separator
2 separator tank
3 primary outlets
4 secondary outlets
5 riser pipe
6 intermediate bottom
7 drain container
8 tertiary outlet
9 valve
10, 10a sealing element
11, 11a stop element
12 inlet
20 fuel cell
21 fuel cell stack
22 anode gas path
23 cathode gas path
22a, 23a inlet section
22b, 23b exhaust gas section
30 motor vehicle
31 power plant
32 operating power line
A central axis
B, Ba operating/release position
D, Da sealing position
P product water
V1 internal volume of the primary outlets
V2 separation volume
V3 drain volume

The invention claimed is:

1. A water separator for separating product water from a fuel cell, including:
a separator tank for receiving the product water, the separator tank including:
a first container;
a riser pipe located in the first container and extending from a bottom of the first container;
a primary outlet and a secondary outlet for discharging the product water from the first container, wherein:
the primary outlet is located in a first section of the bottom of the first container that is exterior to where the riser pipe connects to the bottom of the first container, and
the secondary outlet is connected to the riser pipe in a fluid conduction manner, and is located in a second section of the bottom of the first container, and
a sealing element, designed to contact the first section of the bottom of the first container and seal the primary outlet in a fluid-tight manner in its sealing position, wherein the riser pipe extends through the sealing element.

2. The water separator as recited in claim 1,
wherein the sealing element is movable relative to the riser pipe, and
wherein the movement of the sealing element is guided through the riser pipe.

3. The water separator as recited in claim 1, wherein the sealing element runs at least partially around the riser pipe.

4. The water separator as recited in claim 1,
wherein the separator tank has at least one additional primary outlet located in the first section of the bottom of the first container.

5. The water separator as recited in claim 1, wherein the wall of the riser pipe and a sealing part of the sealing element are designed as concentric rings.

6. The water separator as recited in claim 1, wherein the sealing element is designed as a floater, the sealing element being designed to be lifted up out of its sealing position by water in the first container only when the fill level of the first container exceeds a predefined value.

7. The water separator as recited in claim 6, wherein the water separator has a stop element, which is provided on the riser pipe and limits the maximum floating height of the sealing element.

8. The water separator as recited in claim 1, wherein:
the separator tank has a second container attached to the bottom of the first container, and
the first container and the second container are fluidically connected by the primary outlet and the secondary outlet.

9. A fuel cell further including a water separator for separating product water of the fuel cell, wherein the water separator is a water separator as recited in claim 1.

10. A motor vehicle including
a power plant and
a fuel cell connected to the power plant for transmitting operating power, wherein the fuel cell is a fuel cell as recited in claim 9.

11. The water separator as recited in claim 1, wherein the riser pipe comprises at least one inlet extending through a wall in the riser pipe.

12. The water separator as recited in claim 11, further comprising a second sealing element wherein the second sealing element closes the at least one inlet when the second sealing element is in its a sealing position.

13. The water separator as recited in claim 8, wherein the second container has a tertiary outlet located in a bottom of the second container.

* * * * *